J. W. CULMER.
Hydrocarbon Burner.
No. 233,212. Patented Oct. 12, 1880.
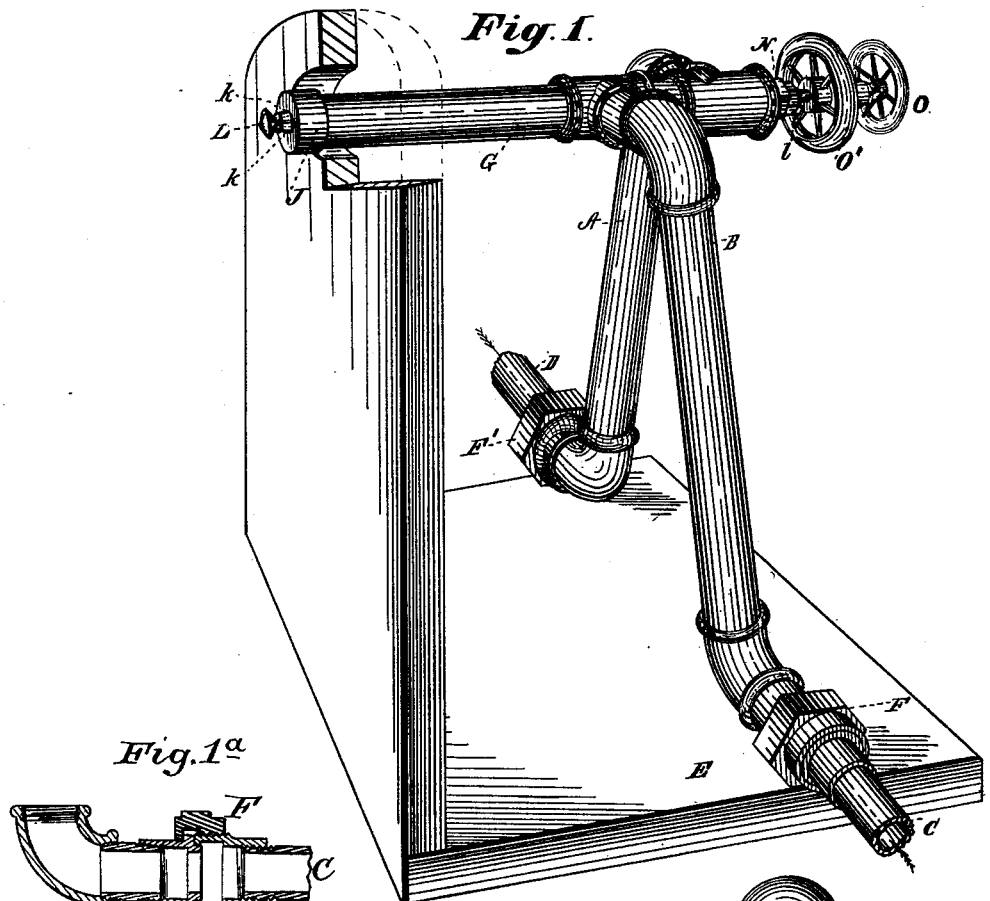
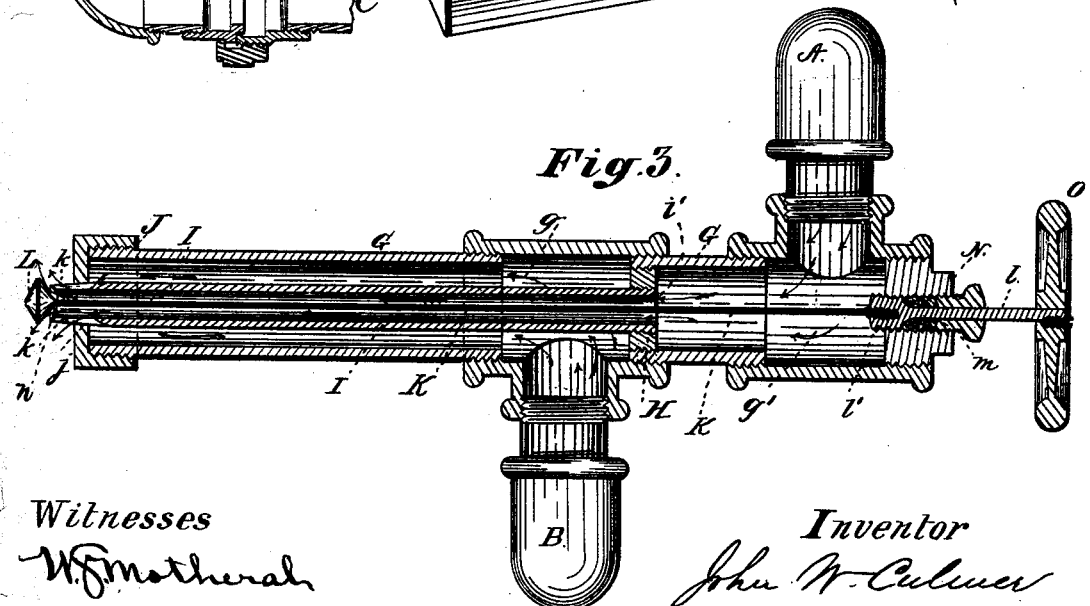
Witnesses
W. F. Motherah
W. R. Edelen
Inventor
John W. Culmer
by William J. Brundred
his Atty (No Model.) 4 Sheets—Sheet 2.
J. W. CULMER.
Hydrocarbon Burner.
No. 233,212. Patented Oct. 12, 1880.
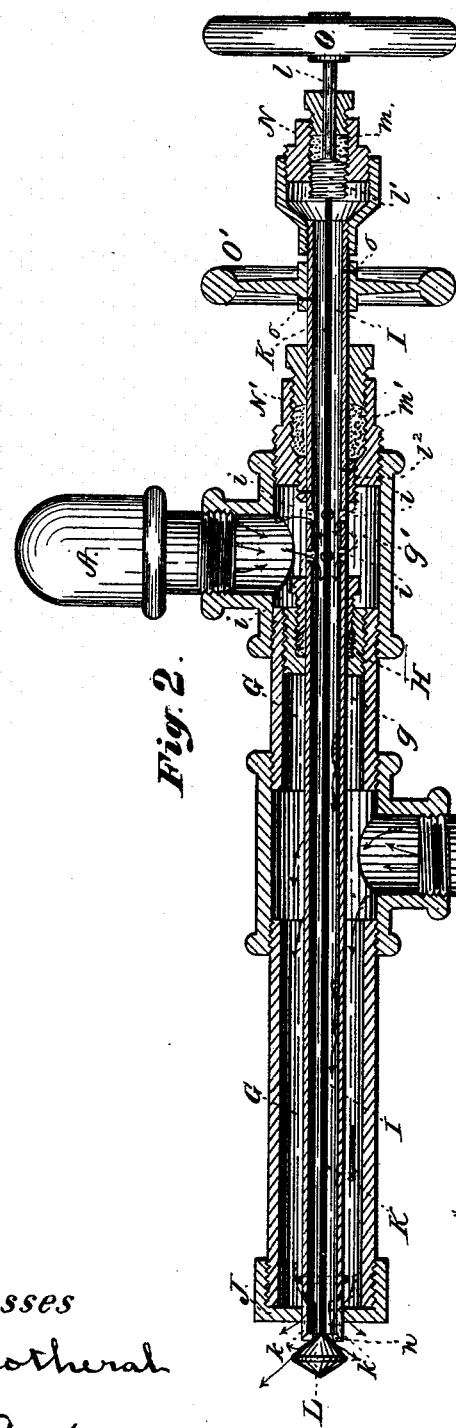
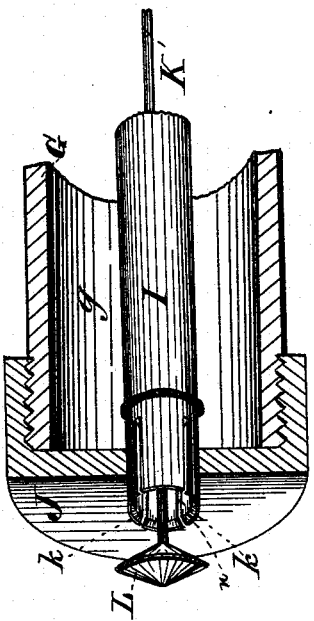
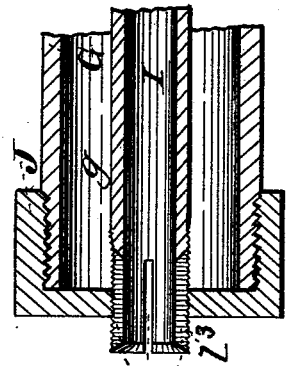
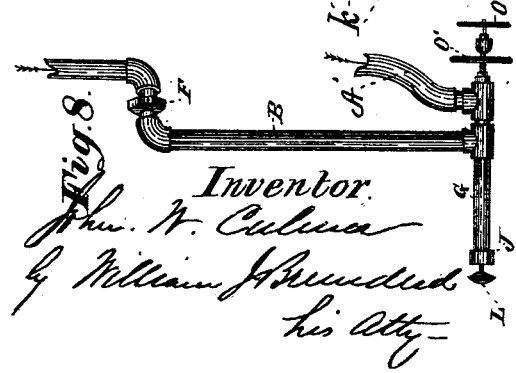
Witnesses
Inventor.

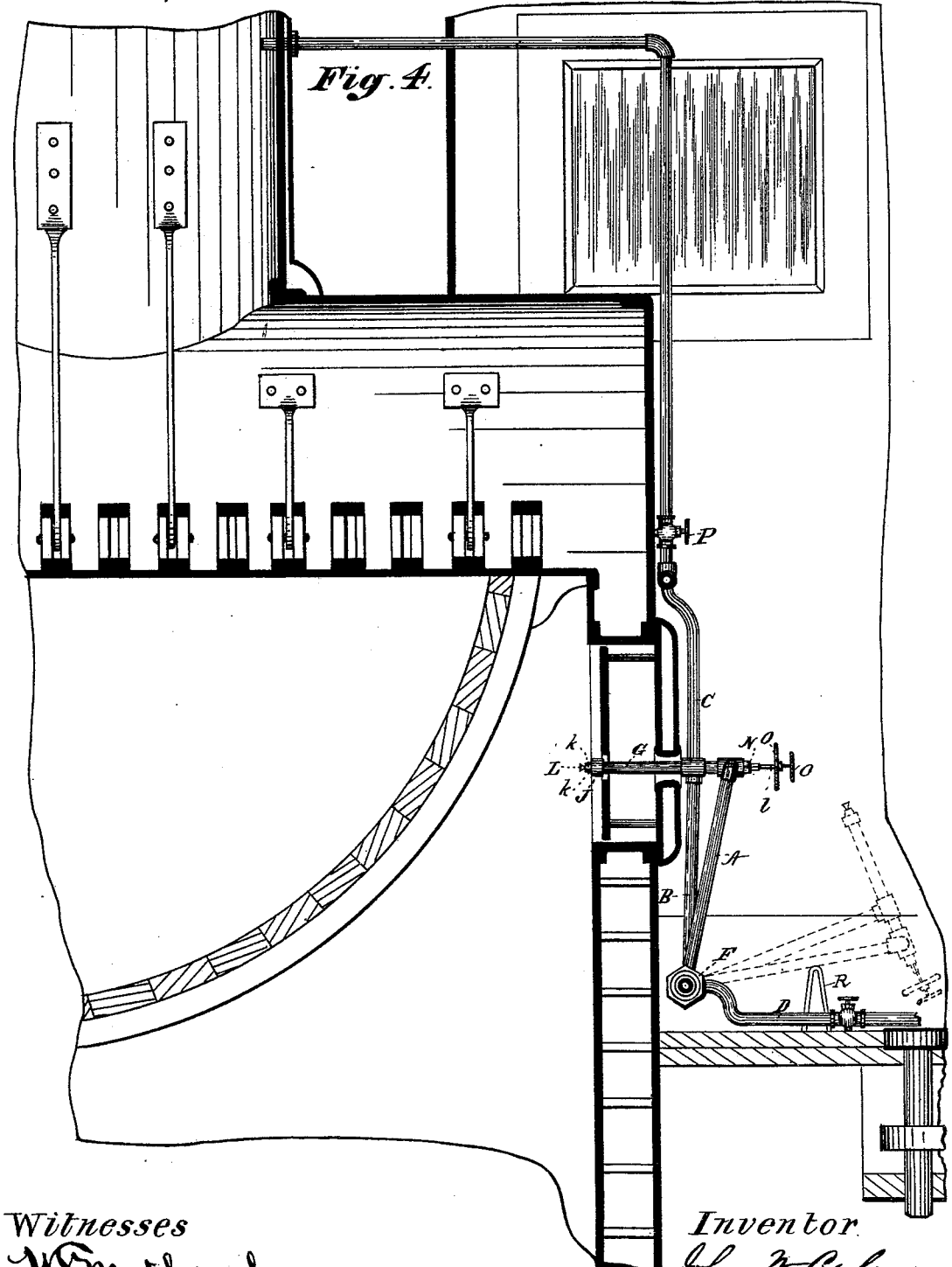

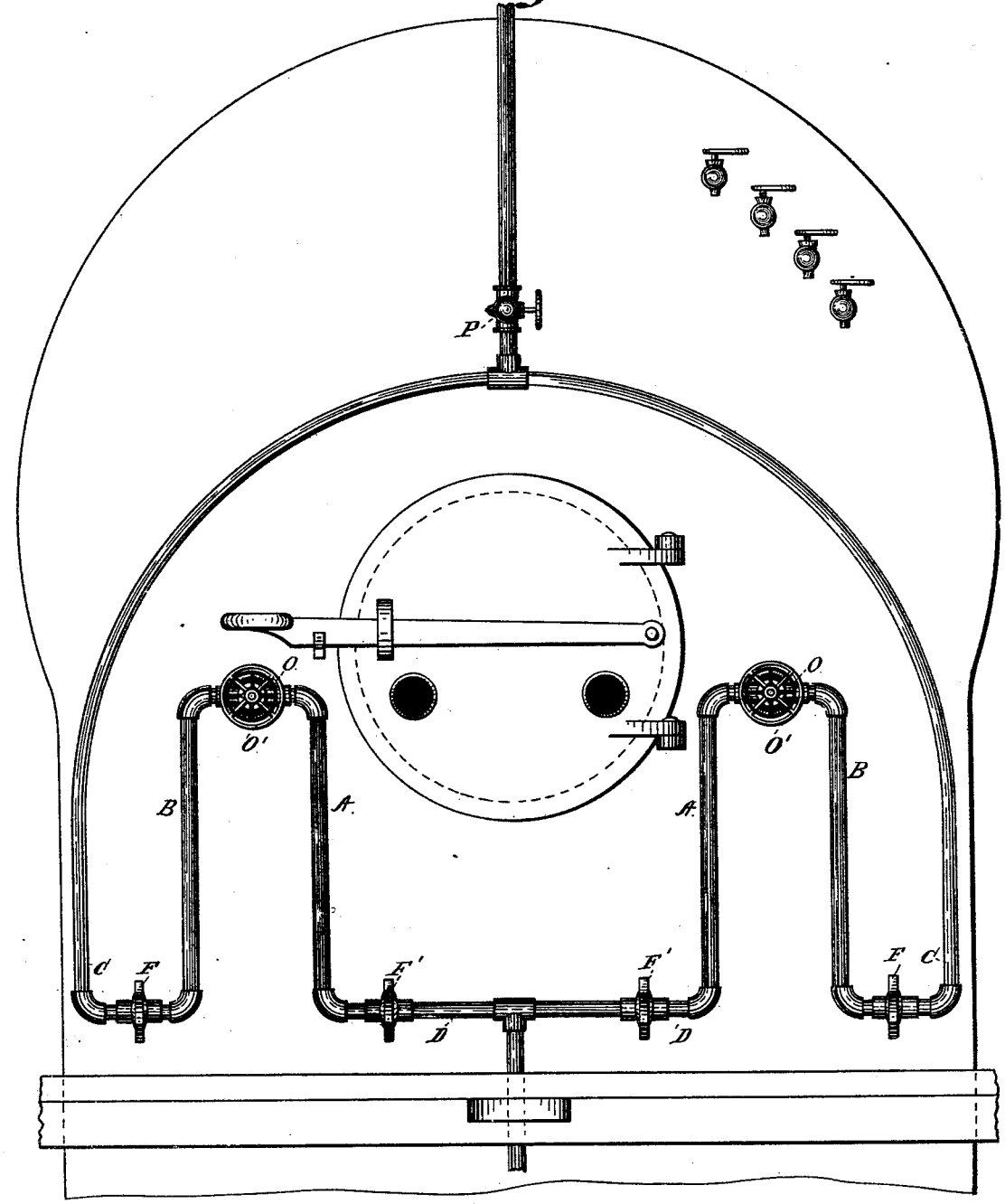

UNITED STATES PATENT OFFICE.

JOHN W. CULMER, OF ALLEGHENY, ASSIGNOR TO THE CULMER MANUFACTURING COMPANY, OF OIL CITY, PENNSYLVANIA.

HYDROCARBON-BURNERS.

SPECIFICATION forming part of Letters Patent No. 233,212, dated October 12, 1880.

Application filed May 31, 1880. (No model.)

*To all whom it may concern:*

Be it known that I, JOHN W. CULMER, of the city of Allegheny, in the county of Allegheny and State of Pennsylvania, have invented certain new and useful Improvements in Hydrocarbon-Burners; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The invention relates to improvements in hydrocarbon-burners which are adapted to locomotive, marine, and stationary boilers, and also for other purposes where an economical fuel is desired.

Heretofore hydrocarbon-burners and liquid-fuel injectors for feeding the fires under boilers in furnaces, &c., have been found more or less objectionable on account of their construction and manner of being manipulated, for the reason that when placed in position the burners and connections become what might be called "rigid fixtures," and if, as is frequently the case, it becomes necessary to examine or adjust the burners, observe their operation, repair them slightly, or remove them temporarily while the steam is being gotten up in the boilers, they are found very unsatisfactory, as in such cases the burners have to be disconnected from their feed-pipes, which is not only very objectionable, but decidedly inconvenient; secondly, it frequently happens the burners clog or become closed from the solidification of the deposited carbon, which is owing to the construction of the devices and defective arrangement of the parts.

There are a few burners, however, which seem to meet most of the wants of certain classes for specific purposes, but none of which are sufficiently perfect to be employed under all general conditions where a burner could be advantageously used, especially under locomotive or marine boilers, where an intense and rapid combustion is required, or where it is necessary to use hydrocarbons of different gravities.

The object of my invention is to provide a hydrocarbon-burner so constructed that it can be readily manipulated at the will of the operator, and so arranged that it promotes perfect combustion by the devices to be hereinafter more fully described; and, further, the object is to have the burner so constructed and arranged that it can be instantly removed from or put any desired distance into the fire-box without disarranging any of its connecting parts or shutting off either of the supplies, and also to provide a hydrocarbon-burner so constructed that the operator can use a liquid fuel of light or heavy specific gravity without changing the construction of the burner.

The invention consists in the arrangement of the feed-pipes connecting with the burner, one or more of which may be hinged on union-couplings, or the equivalent, so as to allow it to be moved forward or backward.

It also consists in the arrangement of the slotted liquid-carbon tube, with the slots extending inside of the binding-cap or end of the burner-tube.

It also consists of a conical deflector or spreader for distributing an annular conical flame-jet.

It further consists in the method of regulating the conical deflector by means of a rod passing centrally through the liquid-carbon tube and operated at its opposite end by a feed-screw and hand-wheel.

It further consists in the liquid-carbon tube being adjusted by means of a feed-screw and hand-wheel and provided with holes or openings to allow the liquid-carbon fuel to flow into said tube.

It further consists in the method of regulating the steam and hydrocarbon pipes either separately or simultaneously, and the corresponding regulation of the supply of the steam and hydrocarbon thereby.

It further consists in the arrangement of the steam and fuel ingress pipes to the horizontal burner-tube.

It further and lastly consists in the arrangement of the liquid-fuel tube whereby the steam enters the fuel-tube inside of the cap, and the drawing and driving the liquid carbon thereby in a gaseous state against the conical deflector, thus disseminating it throughout the furnace.

In the accompanying drawings, in which similar letters of reference indicate like parts, Figure 1 represents a perspective view of the improved hydrocarbon-burner, shown projecting into a fire-box in working position. Fig. 1ª represents, in longitudinal section, one of the union-joints to connect one of the stationary supply-pipes to its movable end. Fig. 2 represents a top view of the burner in section, with the oil-tube adjustable. Fig. 3 represents a similar view in section, with the oil-tube rigid in position. Fig. 4 represents a side elevation of the burner projecting through the door into the fire-box of a locomotive. It is also shown thrown back in dotted lines clear of the fire-box. Fig. 5 represents a pair of burners extending into the fire-box on both sides of the door, also shows the door perforated for two burners. Fig. 6 represents an enlarged view of part of the burner, with the feed-screw engaging with the cap or end of the burner-tube. Fig. 7 represents an enlarged view in sectional perspective, showing the slots for the passage of steam extending on opposite sides of the cap. Fig. 8 represents a side elevation of the burner in a working position, having a flexible feed-tube and the other feed-pipe hinged.

The invention is provided with feed-pipes A and B, one or more of which may be flexible, and which are secured to the various pipes by appropriate connections.

In Fig. 1, extending from and connecting with feed-pipes A and B, are two pipes, C and D, which can be secured to a platform or floor, E. The feed-pipes are so constructed and arranged by means of one or more union-couplings, F F', or the equivalent, that the burner can be moved on one or more hinges or pivots forward or backward in the arc of a circle. The unions which form a hinge for swinging the burner on, when necessary, are on a common center on the floor E; but the pipes A and B are not so shown where they connect with the burner-tube G, but they can be connected to said tube opposite to each other, if desired.

The object of connecting said feed-pipes with tube G, as shown at Figs. 1, 2, and 3, is to prevent the liquid carbon and steam from mixing at that point. Said tube G is divided into two chambers, $g$ and $g'$, by means of the diaphragm H. In connection with said diaphragm is a liquid-carbon tube, I, which extends forward and preferably projects slightly through the cap J, which is secured to steam or burner tube G. The projecting end of said tube I can be slightly tapering at $j$, so as to fit tightly into a conical seat formed in the cap J. The front or projecting end of tube I is provided with one or more slots, $k$, or other equivalent openings, which extend backward beyond the inner or under surface of cap J, or its equivalent, into a steam-chamber, $g$, of a burner-tube, G, as shown at Figs. 2, 3, 6, and 7.

In Fig. No. 2 the oil-tube I extends entirely through the steam-tube G, and is adjustable by means of a feed-screw, $l^2$, secured to said tube I, or it may be adjusted by means of the feed-screw $l^3$, as shown in Fig. 6, and provided with a stuffing-box, $m'$, formed in the plug N', and operated by a hand-wheel, O', secured to tube I by rivets $o\ o$.

By this device the flow of steam from tube G into the oil-tube I can be regulated, or can be entirely shut off from slots $k$ in the liquid-carbon tube I. The liquid carbon flows into tube I through one or more holes or openings, $i\ i$, as shown at Fig. 2, while in Fig. 3 it flows through the unobstructed end $i'$ of tube I.

Passing centrally through said tube I, and partly through steam-tube G, is a wire or rod, K, which is provided at one end with a conical deflector, L, which disseminates the gaseous vapor into an annular conical sheet of intensely-heated flame throughout the fire-chamber. The opposite end of said rod is secured to a stem, $l$, which is provided with a feed-screw, $l'$, and stuffing-box $m$, formed in the plug N, and operated by a hand-wheel, O. This deflector can be dispensed with, if desired, in operating the burner. (See Fig. 6.)

The liquid hydrocarbon for feeding the burner flows from a reservoir through pipes D and A into the chamber $g'$, thence into the hydrocarbon-tube I. The steam enters through pipes C and B into steam-chamber $g$ of steam-tube G and envelopes the liquid-carbon tube I, partly vaporizing the liquid fuel before its final exit from its tube. As the steam enters chamber $g$ it is forced with great velocity through the slots $k$ into the hydrocarbon-tube I, where it cuts the partly-vaporized liquid fuel and converts it into highly inflammable gas, which, with the steam, escapes against the conical deflector L, thus causing perfect and very economical combustion throughout the furnace or fire-box. The steam and oil are regulated to a certain extent by means of the conical deflector, which acts as a valve when drawn against the inclined seat formed at the end of tube I.

The steam is regulated mainly by the stop-cock P, which is secured to the supply-pipe communicating with the dome of the boiler, as shown in Fig. 4.

When it is necessary to remove the burner from the fire-box or furnace, it is thrown back on the floor or platform E, or else against a stop, R, or other equivalent rest, which prevents the hand-wheel from being injured, as shown in dotted lines at Fig. 4.

The burners shown at Fig. 5 can be thrown down separately, and a number of them can be applied to various parts of the fire-box, as it is not absolutely necessary to place them in the front only.

I am aware that hydrocarbon-burners have been constructed having a projecting central oil-tube and surrounded by a steam-jacket provided with an adjustable cap having steam-jet openings converging upon the orifice of the oil-tube, and also that that portion of the end of this oil-tube which extends beyond the outside of the cap has sometimes been slotted a little to correspond with the number of steam-jet openings in the cap; and I am also aware that some have been constructed with the steam-jacket projecting beyond the orifice of the oil-tube and having the end of the oil-tube conical to fit a corresponding conical seat on the inside of the end of the said steam-jacket, whereby, according to the adjusting of the oil-tube, a greater or less volume of steam can be discharged through this annular opening to converge upon the orifice of the oil-tube, and also that some of these latter burners have been provided with flame-spreaders screwed onto the end of the burner, like a cap, and having outwardly-spreading orifices in the same, through which the vaporized hydrocarbon passes from the burner; and I therefore do not claim these; but What I do claim and set forth as my invention, and which I desire to secure by Letters Patent, is—

1. A hydrocarbon-burner having an internal oil-tube and external steam-jacket connected together and adapted to be passed in and out of openings in the side or door of a firebox or furnace by means of journaled pipes projecting from the sides of said burner, and provided with one or more unions or couplings as hinges upon said pipes, whereby said burner can be oscillated and the incoming hydrocarbon and steam may have an uninterrupted flow to the above-described burner in any position occupied by the latter, substantially as set forth.

2. In a hydrocarbon-burner having an internal oil-tube and external steam-jacket connected together, the combination of a steam-jacket, G, diaphragm H therein, and adjustable cap J, with internal oil-tube, I, secured to said diaphragm and made with its forward part slotted longitudinally and projecting through said cap, substantially as shown and described.

3. A hydrocarbon-burner provided with one or more slots or openings so formed in an oil-tube, I, as to extend into a chamber, $g$, of a burner-tube, G, for allowing steam, air, or gas to enter said tube I and mix with and more or less vaporize the hydrocarbons before their exit from said oil-tube, substantially as shown and described, and for the purpose set forth.

4. In a hydrocarbon-burner, the combination of an external steam-jacket, an internal oil-tube provided with longitudinal slots in the forward part, the end of said oil-tube being adapted to pass through the forward end of the steam-jacket, and an external conical flame deflector or spreader, with a rod, K, feed-screw $l'$, and handle O, substantially as shown and described.

5. In a hydrocarbon-burner, the combination of an external steam-jacket, the forward end of said jacket having an opening therethrough, and said opening screw-threaded, with a central oil-tube having longitudinal slots and screw-threaded end $l^3$, whereby the supply of steam can be regulated, substantially as set forth.

In testimony that I claim the foregoing as my own I have affixed my signature in presence of two witnesses.

JNO. W. CULMER.

Witnesses:
H. ECKARDT,
W. H. EDWARDS.